United States Patent Office 3,121,696
Patented Feb. 18, 1964

3,121,696
METHOD FOR PREPARATION OF A HYDROCARBON CONVERSION CATALYST
James Hoekstra, Evergreen Park, Ill., assignor to Universal Oil Products Company, Des Plaines, Ill., a corporation of Delaware
No Drawing. Filed Dec. 6, 1960, Ser. No. 73,990
9 Claims. (Cl. 252—441)

This invention relates to a novel method of catalyst preparation, and particularly to a novel method for the preparation of a hydrocarbon conversion catalyst comprising a group VIII metal and an alumina containing combined fluorine.

Catalysts of the type herein contemplated have found extended use as hydrocarbon conversion catalysts. The present method is based on the discovery of a novel method of preparation which overcomes certain difficulties experienced in the utilization of conventional methods of preparation in catalysts of the type herein contemplated. For example, a catalyst comprising platinum, and alumina containing combined fluorine has in recent years found extensive use as an isomerization catalyst. Conventional methods of preparation generally involve the preparation of an alumina sol and the inclusion therein of hydrogen fluoride. The sol is prepared by adding a suitable reagent such as ammonium hydroxide, to a solution of a salt of aluminum in an amount sufficient to form an alumina sol. The hydrogen fluoride is added to the sol which is thereafter allowed to form a gel. The gelation is followed by drying and calcination to form the desired alumina containing combined fluorine which is thereafter impregnated with platinum. The method of preparation set out above is well-known to those skilled in the art and need not be set out in further detail.

Certain difficulties are encountered during the course of preparation of catalysts of the type herein contemplated, and particularly those comprising alumina containing combined fluorine, when using conventional methods as heretofore practiced. For example, an alumina sol containing combined fluorine, upon gellation, results in a softer particle than is the case in the preparation of alumina alone, and during the drying and calcination thereof is subject to excessive breakage. Further, the dried and calcined particle retains carbonaceous material the reason for which, at the present, is merely speculative. It has been observed that the methods of catalyst preparation of this invention obviates the above mentioned difficulties experienced through the utilization of conventional methods.

It is an object of this invention to present a novel method for the preparation of a hydrocarbon conversion catalyst comprising a group VIII metal and a refractory metal oxide containing combined halogen.

It is a more specific object to present a novel method for the preparation of a hydrocarbon conversion catalyst comprising platinum and alumina containing combined fluorine which averts each of the aforementioned difficulties.

In one of its broader aspects this invention embodies a method for the preparation of a hydrocarbon conversion catalyst which comprises contacting a refractory metal oxide with a mixture comprising steam and a volatile halide at a temperature of from about 1000° F. to about 1400° F. and forming a refractory metal oxide carrier material containing combined halogen, and depositing thereon a metal of group VIII of the periodic table.

Another embodiment is in a method for the preparation of a hydrocarbon conversion catalyst which comprises contacting alumina with a mixture comprising steam and a volatile fluoride at a temperature of from about 1000° F. to about 1400° F. and forming an alumina carrier material containing combined fluorine, and depositing thereon from about 0.1 wt. percent to about 10 wt. percent of a metal of group VIII of the periodic table.

A further embodiment is in a method for the preparation of a hydrocarbon conversion catalyst which comprises contacting a mixture comprising hydrogen fluoride and steam in a ratio of from about .05:1 to about 0.5:1 with alumina at a temperature of from about 1000° F. to about 1400° F. and forming an alumina carrier material containing from about 3 wt. percent to about 5 wt. percent combined fluorine, and depositing thereon from about 0.1 wt. percent to about 2 wt. percent platinum.

Further objects and embodiments will become apparent in the following detailed description of the present method of catalyst preparation.

In accordance with the method of catalyst preparation of the present invention a refractory metal oxide is contacted with a mixture comprising steam and a volatile halide to form a refractory metal oxide carrier material containing combined halogen.

The refractory metal oxides herein referred to are high surface area solids. Suitable refractory metal oxides are characterized by a surface area of at least 50 square meters per gram. However, it is preferred to utilize a higher surface area refractoy metal oxide, for example, one which has a surface area of from about 100 to about 300 square meters per gram. The surface areas referred to are determined by the B.E.T. method proposed by Brunauer, Emmet, and Teller in JACS, vol. 60, pp. 390, 1938.

The halogen can be combined with a variety of refractory metal oxides according to the method of this invention. However, the various metal oxides are not necessarily equivalent with respect to their ability to combine with any given halogen nor with respect to the ultimate effect of such combination. Suitable refractory metal oxides include alumina, titanium dioxide, zirconium dioxide, chromia, zinc oxide, silica-alumina, chromia-alumina, alumina-boria, silica-zirconia, and various naturally occurring refractory metal oxides in various states of purity such as, for example, bauxite, kaolin or bentonite clay which may or may not have been acid treated, also diatomaceous earth, such as kieselguhr, montmorillonite, etc., and spinels, such as magnesium oxide-alumina spinels or zinc oxide spinels, etc. In some instances the refractory metal oxide may contribute to the over-all activity of the final catalyst composite, either by exerting an independent effect or, more probably, by a peculiar association with the other components of the catalyst to give a final catalyst of improved properties.

Of the above-mentioned refractory metal oxides, alumina is preferred, and particularly synthetically prepared gamma-alumina of a high degree of purity. In the present specification and appended claims, the term alumina is employed to mean porous aluminum oxide in all states of hydration, as well as aluminum hydroxide. The alumina may be synthetically prepared or naturally occurring and it may be of the crystalline or gel type. The typical aluminas hereinabove described are intended as illustrative rather than limiting on the scope of the present invention.

As stated hereinabove, the alumina is preferably synthetically prepared gamma-alumina and of a high degree of purity. The methods of preparation of such synthetic gamma-aluminas are well known. For example, they may be prepared by the calcination of alumina gels which are commonly formed by adding a suitable reagent such as ammonium hydroxide, ammonium carbonate, etc. to a solution of a salt of aluminum, such as aluminum chloride, aluminum sulfate, aluminum nitrate, etc., in an amount to form an aluminum hydroxide gel which on drying and calcination is converted to gamma-alumina. It has been found that aluminum chloride is generally preferred as the aluminum salt, not only for convenience and subsequent washing and filtering procedures, but also because it appears to give the best results. Alumina gels may also be prepared by the reaction of sodium aluminate with a suitable acidic reagent to cause precipitation thereof with the resultant formation of an aluminum hydroxide gel. Synthetic aluminas may also be prepared by the reaction of metallic aluminum with hydrochloric acid, acetic acid, etc., which sols can be gelled with suitable precipitating agents, such as ammonium hydroxide, followed by drying and calcination. In any of the above instances wherein the alumina is prepared from an alumina sol or alumina gel, the resultant product is calcined at a sufficient temperature to convert the product into gamma-alumina. The calcination may be prior to, or subsequent to, treatment with the steam-fluoride mixture as hereinafter described although the latter procedure is preferred.

The refractory metal oxides are formed into particles, preferably of a uniform size and shape, prior to combination with the selected halogen. By one method a suitable pelleting agent, including hydrogenated vegetable oils, graphite, etc., is commingled with the metal oxide in a powdered form and the metal oxide thereafter formed into pellets. The metal oxide may also be formed into the desired shape by extrusion methods, etc.

A preferred method of forming the metal oxide is in the preparation of a sol, such as by digesting aluminum in hydrochloric acid, and discharging the sol, by means of a nozzle or rotating disc, into a water immiscible suspending medium, such as oil, and forming firm gel spherical particles during passage therethrough. The spheres thus formed may be removed from the bath in any suitable manner, such as by a stream of water disposed beneath the oil layer.

Regardless of the method by which the refractory metal oxide particles are formed they are dried and subsequently calcined. As previously mentioned, calcination may be prior to, or subsequent to, the halogen treatment hereinafter described although the latter course is preferred.

The refractory metal oxide is associated with what is known in the art as combined halogen. The method of this invention is particularly useful where the combined halogen is fluorine and the further description of the method of this invention will be in relation thereto. However, other halogens, i.e. chlorine, bromine, iodine may be combined with the refractory metal oxide although not necessarily with the same or equivalent results. The fluorine is combined with the refractory metal oxide by contacting said metal oxide with a mixture comprising steam and a steam-soluble fluoride. Suitable fluorides include hydrogen fluoride, boron trifluoride, aluminum fluoride, etc. Hydrogen fluoride is preferred and will be used in the remaining portion of these specifications to further illustrate the method of this invention.

A preferred catalyst composition comprises a group VIII metal deposited on an alumina carrier material containing from about 2 wt. percent to about 5 wt. percent combined fluorine. To achieve a uniform distribution of the fluorine on the alumina, it is highly desirable to utilize an excess of a mixture comprising, for example, hydrogen fluoride and steam. When an excess of the mixture is utilized the amount of fluorine which will combine with the alumina is in part dependent on the particular ratio of fluoride to steam in the mixture and in part on the particular temperature at which combination takes place. Alumina is susceptible to combination with from about 2 wt. percent to about 5 wt. percent fluorine at a temperature of from about 1000° F. to about 1400° F. by the method herein proposed. From about 2 wt. percent to about 5 wt. percent fluorine can be combined with alumina in the aforesaid temperature limitations by contacting said alumina with an excess of a mixture comprising hydrogen fluoride and steam. The effective ratio of hydrogen fluoride to steam in said mixture is from about 0.05:1 to about 0.5:1 based on weight. As the ratio varies from about 0.05:1 to about 0.5:1 the final fluorine content of the alumina will vary from about 2 wt. percent to about 5 wt. percent with the temperature remaining constant. The fact that the hydrogen fluoride-steam mixture is used in excess of the amount required to achieve the desired degree of halogen combination does not alter the foregoing statement. The amount of fluorine which combines with the alumina will remain substantially constant at a given hydrogen fluoride-steam ratio regardless of the excessive amounts used and regardless of the extent to which the hydrogen fluoride-steam mixture is diluted as hereinafter set forth.

With the hydrogen fluoride-steam ratio remaining constant within the prescribed limits, variations in temperature from about 1000° F. to about 1400° F. will result in a final fluorine content of from about 2 wt. percent to about 5 wt. percent. The preferred, and more convenient method, is to maintain a constant temperature and select a corresponding hydrogen fluoride-steam ratio to yield the desired fluorinated alumina. For example, at a temperature of about 1200° F. the amount of fluorine combining with alumina remains substantially constant at about 4.5 wt. percent over a hydrogen fluoride-steam ratio of from about 0.1:1 to about 0.5:1 even though variable excesses of hydrogen fluoride-steam mixtures and variable amounts of diluent nitrogen were used.

As has been indicated it may be beneficial in some cases to dilute the hydrogen fluoride-steam mixture with an inert gas such as nitrogen. Such dilution does not effect the ultimate fluorine content of the alumina which remains dependent on the factors previously set forth. Any desired amount of fluorine within the specified range of from about 2 wt. percent to about 5 wt. percent, can be combined with the preferred alumina by the utilization of a proper combination of temperature and fluoride-steam ratio which may be readily determined by one skilled in the art.

The fluorine may be combined with the alumina in a batch type of operation wherein an excess of a mixture comprising hydrogen fluoride and steam in the desired ratio are charged to a suitable vessel, such as an autoclave, containing therein the alumina particles to be fluorinated. The autoclave is heated to a temperature of from about 1000° F. to about 1400° F., preferably while being rotated, for a period of time which may be determined by observation of the pressure drop in the vessel. Another method is to place the alumina particles in a fixed bed within a suitable tubular reactor and continuously pass a mixture comprising hydrogen fluoride and steam in the desired ratio through the alumina bed which is maintained at from about 1000° F. to about 1400° F. until the desired degree of fluorination is obtained.

The preferred synthetically prepared alumina containing from about 2.0 wt. percent to about 5.0 wt. percent combined fluorine, as hereinbefore set forth, is composited with metal of group VIII. Suitable metals of group VIII which may be utilized include nickel, cobalt, iron, platinum, palladium, rubidium, ruthenium, rhodium, iridium, and osmium. The group VIII metal components can be combined with the preferred alumina containing combined fluorine in any suitable manner. For example, the fluorinated alumina can be soaked, dipped, suspended, or otherwise immersed in a solution of a suitable compound of a metal of group VIII. Suitable compounds include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric chloride, ferric bromide, ferric fluoride, ferric nitrate, ferric sulfate, ferric formate, ferric acetate, platinum chloride, chloroplatinic acid, chloropalladic acid, palladium chloride, etc.

The group VIII metal component of the catalyst of this invention may comprise from about 0.1 wt. percent to about 10 wt. percent of the final catalyst composite. Of the group VIII metals, it is generally preferred to utilize a platinum group metal, i.e. platinum, palladium, ruthenium, rhodium, iridium, and osmium. Of the platinum group metals platinum is particularly preferred. While the amount of a platinum group metal composited with the fluorinated alumina is not critical, for economic reasons the amount is usually kept at a minimum. Thus, although larger amounts of platinum do not have a detrimental effect, it is generally preferred to utilize from about 0.1% to about 2.0% by weight of platinum based on the dry alumina. After the platinum, in the desired concentration, has been fixed on the alumina, the composite is preferably dried at a temperature of from about 212° F. to about 392° F. for a period of from about 0.5 to about 24 hours. The catalyst may now be subjected to high temperature treatment, and this may consist of one or more methods. The preferred method is to subject the final catalyst composite to calcination at a temperature of from about 800° F. to about 1200° F. for a period of from about 2 to about 8 hours or more. Another method is to subject the final catalyst composite to hydrogen or to hydrogen containing gases at a temperature of from about 300° F. to about 575° F. for about 4 to about 12 hours or more, preferably followed by calcination at a temperature of from about 800° F. to about 1200° F. In still another method the final catalyst composite may be subjected to reduction with hydrogen or hydrogen containing gases at a temperature of from about 800° F. to about 1200° F. for a period of from about 2 to about 10 hours or more.

Catalysts of the type herein contemplated, and prepared in accordance with the method of the present invention, can be utilized under suitable reaction conditions to the effect a variety of hydrocarbon conversion reactions. Generally, condensation reactions, wherein hydrocarbon molecules of the same or different size are combined to form a new molecule of greater complexity, may be catalyzed by the catalyst herein described, also decomposition reactions in which a hydrocarbon molecule is decomposed to form a smaller or simpler molecule, or alkylation reactions as where an alkyl radical is combined with a hydrocarbon molecule, and transalkylation reactions in which a hydrocarbon radical is transferred from one molecule to another.

The preferred catalyst of this invention functions particularly well at isomerization conditions of temperature (generally from about 480° F. to about 880° F.) and pressure (generally at from about 100 p.s.i. to about 1500 p.s.i.) to isomerize isomerizable hydrocarbons, especially paraffins including n-butane, n-pentane, n-hexane, n-heptane, n-octane, etc., or mixtures thereof including the isomerization of less highly branched-chain saturated hydrocarbons such as the isomerization of 2- or 3-methylpentane to 2,3- and 2,2-dimethylbutane.

The following examples are presented to further illustrate the advantages of catalyst preparation embodied in the present method but with no intention of unduly limiting the same.

*Example I*

Alumina spheres containing combined fluorine were prepared by the general method of dissolving aluminum pellets in hydrochloric acid to form a sol containing about 15% alumina. Hydrofluoric acid was added to the sol in an amount such that the alumina gel subsequently formed contained about 4.5 wt. percent combined fluorine. The hydrogen fluoride and alumina sol was mixed with hexamethylenetetraamine in a continuous mixing operation. The resulting sol was added drop wise to an oil bath maintained at about 195° F., said sol forming spheres as it passed therethrough. The spheres were washed in oil, and then in an aqueous ammonia solution. Prior to drying, the spheres thus prepared were of a softer character than is the case when spheres are prepared in this manner in the absence of hydrogen fluoride and tend to coagulate to a considerable extent. Subsequently, on drying at about 480° F. and calcining at about 1200° F., the spheres experienced a considerable amount of breakage. Further, the calcined spheres were blackened in appearance. This is attributable to the retention of carbonaceous material during the course of preparation.

The method of catalyst preparation herein disclosed, and subsequently illustrated in Example II, overcomes the difficulties experienced in the general method of preparation involving the addition of hydrogen fluoride to the alumina sol such as poor gelation of the sol, breakage of the spheres during drying and calcination thereof, and the retention of carbonaceous material after calcination.

*Example II*

Alumina spheres containing combined fluorine were prepared by dissolving aluminum pellets in hydrochloric acid to form a sol containing about 15% alumina. The resulting sol was mixed with hexamethylenetetraamine in a continuous mixing operation. The sol was then added dropwise to an oil bath maintained at about 195° F., said sol forming spheres as it passed therethrough. The spheres were aged in oil, and then in an aqueous ammonium solution. The spheres were then transferred to a drier and dried at a temperature of about 480° F. The dried alumina spheres were thereafter placed in a fixed bed within a stainless steel tubular reactor. The temperature of the alumina bed was raised to about 1200° F. and a mixture comprising about 30 wt. percent HF and about 70 wt. percent steam, diluted with nitrogen, was continuously passed therethrough. The resulting gamma-alumina spheres contained about 4.6 wt. percent combined fluorine.

*Example III*

The fluorinated alumina spheres of Example II were impregnated with a solution of chloroplatinic acid containing 1% hydrochloric acid and 1% nitric acid based on the weight of the dry fluorinated alumina. The amount of platinum in the solution was adjusted so that the final catalyst contained about 0.375% platinum by weight, based on the dried fluorinated alumina. The catalyst composite was thereafter calcined in air at a temperature of about 930° F. The final catalyst composite thus comprises 0.375 wt. percent platinum on gamma-alumina containing 4.6 wt. percent combined fluorine.

100 cc. of the above-prepared catalyst composite is placed in a fixed bed within a tubular reactor and tested for isomerization activity. A charge stock comprising 99.3% n-pentane is charged to the reactor at a LHSV of about 3.0. Hydrogen is charged with the n-pentane is a mol ratio of about 2:1. The reactor is maintained at a pressure of about 500 p.s.i.g. and at a temperature of about 600° F. After a period of about 20 hours on stream the reactor effluent comprises about 65% isopentane. These results indicate that this catalyst composition is particularly effective as an isomerization catalyst.

I claim as my invention:

1. A method for the preparation of a hydrocarbon conversion catalyst which comprises contacting a refractory metal oxide with a mixture comprising a volatile halide and steam in a ratio of from about .05:1 to about 0.5:1 at a temperature of from about 1000° F. to about 1400° F. and forming a refractory metal oxide carrier material containing from about 3 wt. percent to about 5 wt. percent combined halogen, and depositing thereon from about 0.1 wt. percent to about 10 wt. percent of a metal of group VIII of the periodic table.

2. A method for the preparation of a hydrocarbon conversion catalyst which comprises contacting a refractory metal oxide with a mixture comprising a volatile fluoride and steam in a ratio of from about .05:1 to about 0.5:1 at a temperature of from about 1000° F. to about 1400° F. and forming a refractory metal oxide carrier material containing from about 3 wt. percent to about 5 wt. percent combined fluorine, and depositing thereon from about 0.1 wt. percent to about 10 wt. percent of a metal of group VIII of the periodic table.

3. A method for the preparation of a hydrocarbon conversion catalyst which comprises contacting alumina with a mixture comprising a volatile halide and steam in a ratio of from about .05:1 to about 0.5:1 at a temperature of from about 1000° F. to about 1400° F. and forming an alumina carrier material containing from about 3 wt. percent to about 5 wt. percent combined halogen, and depositing thereon from about 0.1 wt. percent to about 10 wt. percent of a metal of group VIII of the periodic table.

4. A method for the preparation of a hydrocarbon conversion catalyst which comprises contacting alumina with a mixture comprising a volatile fluoride and steam in a ratio of from about .05:1 to 0.5:1 at a temperature of from about 1000° F. to about 1400° F. and forming an alumina carrier material containing from about 3 wt. percent to about 5 wt. percent combined fluorine, and depositing thereon from about 0.1 wt. percent to about 10 wt. percent of a metal of group VIII of the periodic table.

5. A method for the preparation of a hydrocarbon conversion catalyst which comprises contacting alumina with a mixture comprising boron trifluoride and steam in a ratio of from about .05:1 to about 0.5:1 at a temperature of from about 1000° F. to about 1400° F. and forming an alumina carrier material containing from about 3 wt. percent to about 5 wt. percent combined fluorine, and depositing thereon from about 0.1 wt. percent to about 10 wt. percent of a metal of group VIII of the periodic table.

6. A method for the preparation of a hydrocarbon conversion catalyst which comprises contacting a mixture comprising hydrogen fluoride and steam in a ratio of from about .05:1 to about 0.5:1 with alumina at a temperature of about 1000° F. to about 1400° F. and forming an alumina carrier material containing from about 3 wt. percent to about 5 wt. percent combined fluorine, and depositing thereon from about 0.1 wt. percent to about 10 wt. percent of a metal of group VIII of the periodic table.

7. A method for the preparation of a hydrocarbon conversion catalyst which comprises contacting a mixture comprising hydrogen fluoride and steam in a ratio of from about .05:1 to about 0.5:1 with alumina at a temperature of from about 1000° F. to about 1400° F. and forming an alumina carrier material containing from about 3 wt. percent to about 5 wt. percent combined fluorine, and depositing thereon from about 0.1 wt. percent to about 2 wt. percent of a platinum group metal.

8. A method for the preparation of a hydrocarbon conversion catalyst which comprises contacting a mixture comprising hydrogen fluoride and steam in a ratio of from about .05:1 to about 0.5:1 with alumina at a temperature of from about 1000° F. to about 1400° F. and forming an alumina carrier material containing from about 3 wt. percent to about 5 wt. percent combined fluorine, and depositing thereon from about 0.1 wt. percent to about 2 wt. percent platinum.

9. A method for the preparation of a hydrocarbon conversion catalyst which comprises contacting a mixture comprising hydrogen fluoride and steam in a ratio of from about .05:1 to about 0.5:1 with gamma alumina at a temperature of from about 1000° F. to about 1400° F. and forming a gamma alumina carrier material containing from about 3 wt. percent to about 5 wt. percent combined fluorine, and depositing thereon from about 0.1 wt. percent to about 2 wt. percent platinum.

References Cited in the file of this patent

UNITED STATES PATENTS

| | | |
|---|---|---|
| 2,154,527 | Pier et al. | Apr. 18, 1939 |
| 2,939,897 | Beber et al. | June 7, 1960 |